United States Patent
Mangadlao et al.

(10) Patent No.: US 11,814,575 B2
(45) Date of Patent: Nov. 14, 2023

(54) ADDITIVES FOR WINTERIZATION OF PARAFFIN INHIBITORS

(71) Applicant: Baker Hughes Oilfield Operations LLC, Houston, TX (US)

(72) Inventors: Joey Dacula Mangadlao, Agusan del Sur (PH); Holley Baron, St. Albert (CA); Mary Jane Legaspi Felipe, Sugar Land, TX (US); Lei Zhang, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 18/072,647

(22) Filed: Nov. 30, 2022

(65) Prior Publication Data

US 2023/0098391 A1    Mar. 30, 2023

Related U.S. Application Data

(62) Division of application No. 16/938,709, filed on Jul. 24, 2020.

(51) Int. Cl.
 *C09K 8/524*   (2006.01)
 *C08G 59/20*   (2006.01)
 (Continued)

(52) U.S. Cl.
 CPC .......... *C09K 8/524* (2013.01); *C08F 265/04* (2013.01); *C08F 265/10* (2013.01);
 (Continued)

(58) Field of Classification Search
 CPC ........ C09K 8/035; C09K 8/524; C09K 8/536; C08G 59/20; C08G 65/2609;
 (Continued)

(56) References Cited

U.S. PATENT DOCUMENTS 2,610,915 A    9/1952 Mattil
3,640,824 A    2/1972 Bucaram et al.
(Continued)

FOREIGN PATENT DOCUMENTS

EP    1403463 A1    3/2004
EP    2258803 A2    12/2010
(Continued)

*Primary Examiner* — Latosha Hines
(74) *Attorney, Agent, or Firm* — Crowe & Dunlevy, P.C.

(57) ABSTRACT

A winterized paraffin inhibitor, which is capable of being used for preventing the deposition of paraffins in hydrocarbon streams and capable of withstanding freezing or crystallization at freezing or sub-freezing temperatures, may be formed by adding an oxyalkylated branched aliphatic compound having 12 or more carbons to a high molecular weight aliphatic polymer paraffin inhibitor, the oxyalkylated branched aliphatic compound having 12 or more carbons being produced by the oxyalkylation of the branched aliphatic compound having 12 or more carbon atoms in which the branched aliphatic compound having 12 or more carbon atoms is grafted with a polyether via a ring-opening reaction, wherein the polyether is a polymer of ethylene oxide, propylene oxide, butylene oxide, and combinations thereof.

7 Claims, 2 Drawing Sheets

Image after blending. Formulation containing 71.4 % Maleic olefin ester based paraffin inhibitor 1 and 28.6 % C20+ oxyalkylated aliphatic additive

(51) Int. Cl.
*C08F 265/10* (2006.01)
*C08F 283/06* (2006.01)
*C08F 265/04* (2006.01)
*C09K 8/536* (2006.01)
*C10L 1/10* (2006.01)
*C10L 1/14* (2006.01)

(52) U.S. Cl.
CPC ............ *C08F 283/06* (2013.01); *C08G 59/20* (2013.01); *C09K 8/536* (2013.01); *C10L 1/10* (2013.01); *C10L 1/14* (2013.01)

(58) Field of Classification Search
CPC .... C08F 265/04; C08F 265/10; C08F 283/06; C10L 1/10; C10L 1/14; C10L 1/146; C10L 1/192; C10L 1/1963; C10L 1/1966; C10L 1/1985; C10L 1/2364; C10L 10/14; C10L 2200/04
See application file for complete search history.

(56) References Cited

U.S. PATENT DOCUMENTS

| | | |
|---|---|---|
| 4,693,312 A | 9/1987 | Lenderman |
| 6,309,431 B1 | 10/2001 | Becker et al. |
| 9,663,740 B2 | 5/2017 | Mead et al. |
| 2004/0058827 A1 | 3/2004 | Jennings |
| 2007/0100002 A1* | 5/2007 | Leinweber ............ C10G 33/04 516/135 |
| 2007/0213231 A1 | 9/2007 | Jennings et al. |
| 2014/0224495 A1 | 8/2014 | Khandekar et al. |
| 2017/0292657 A1 | 10/2017 | Kundu et al. |
| 2020/0017790 A1 | 1/2020 | Weers |

FOREIGN PATENT DOCUMENTS

| | | |
|---|---|---|
| WO | 2005098200 A2 | 10/2005 |
| WO | 2017120286 A1 | 7/2017 |
| WO | 2019112550 A1 | 6/2019 |

* cited by examiner

ADDITIVES FOR WINTERIZATION OF PARAFFIN INHIBITORS

CROSS-REFERENCE TO RELATED APPLICATION

This application is a divisional patent application from U.S. patent application Ser. No. 16/938,709 filed Jul. 24, 2020, issued as U.S. Pat. No. 11,566,160, issued Jan. 31, 2023, incorporated by reference herein in its entirety.

TECHNICAL FIELD

The present invention relates to winterizing additives, and more particularly relates to additives for winterizing high molecular weight aliphatic polymer paraffin inhibitors that are used to prevent wax or paraffin deposition in crude oils and other hydrocarbon fluids.

BACKGROUND

Paraffin inhibitors are chemicals used in the production of oil and gas to prevent or minimize the deposition of naturally-occurring paraffins in crude oils and other produced fluids and to reduce their viscosity in order to improve flow in the production, transportation, and storage of these fluids.

These chemicals are sometimes applied in cold sub-sea conditions, such as in Canada, in which temperatures range from 0° C. to −40° C., sometimes even colder. Many paraffin inhibitors used in these environments are composed of high molecular weight aliphatic polymer chains having long chain alkyl moieties, which routinely solidify at sub-zero temperatures. Typically, smaller molecular additives, like methanol, isopropanol, etc., are used to "winterize" these paraffin inhibitors, which means to prevent the freezing or crystallization of the paraffin inhibitor during use or storage in freezing or sub-freezing temperatures. However, it has been shown that the long chain alkyl moiety materials in the paraffin inhibitors are incompatible with alcohols, causing the product to precipitate and lead to solids formation and phase separation.

Therefore, there is a need for developing winterizing additives that can prevent the freezing or crystallization of high molecular weight aliphatic polymer paraffin inhibitors in sub-zero temperature conditions without attendant solids formation or phase separation and that can stabilize these types of paraffin inhibitors for longer term use and storage at such temperatures.

SUMMARY

There is provided, in one form, a method for winterizing a paraffin inhibitor in which an oxyalkylated linear or branched aliphatic compound having 12 or more carbon atoms is introduced into a paraffin inhibitor composed of a high molecular weight aliphatic polymer in an effective amount to prevent freezing or crystallization of the paraffin inhibitor at temperatures ranging from about 0° C. to −40° C.

There is further provided in another non-limiting form, a winterized paraffin inhibitor formulation made up of about 1 wt. % to about 70 wt. % of an oxyalkylated branched aliphatic compound having 12 or more carbons and the remainder being made up of a high molecular weight aliphatic polymer paraffin inhibitor.

In one non-limiting embodiment, the oxyalkylated branched aliphatic compound is formed by the oxyalkylation of the branched aliphatic compound having 12 or more carbon atoms in which the branched aliphatic compound having 12 or more carbon atoms is grafted with a polyether via a ring-opening reaction, wherein the polyether is a polymer of ethylene oxide, propylene oxide, butylene oxide, and combinations thereof.

DETAILED DESCRIPTION

Figure 1:
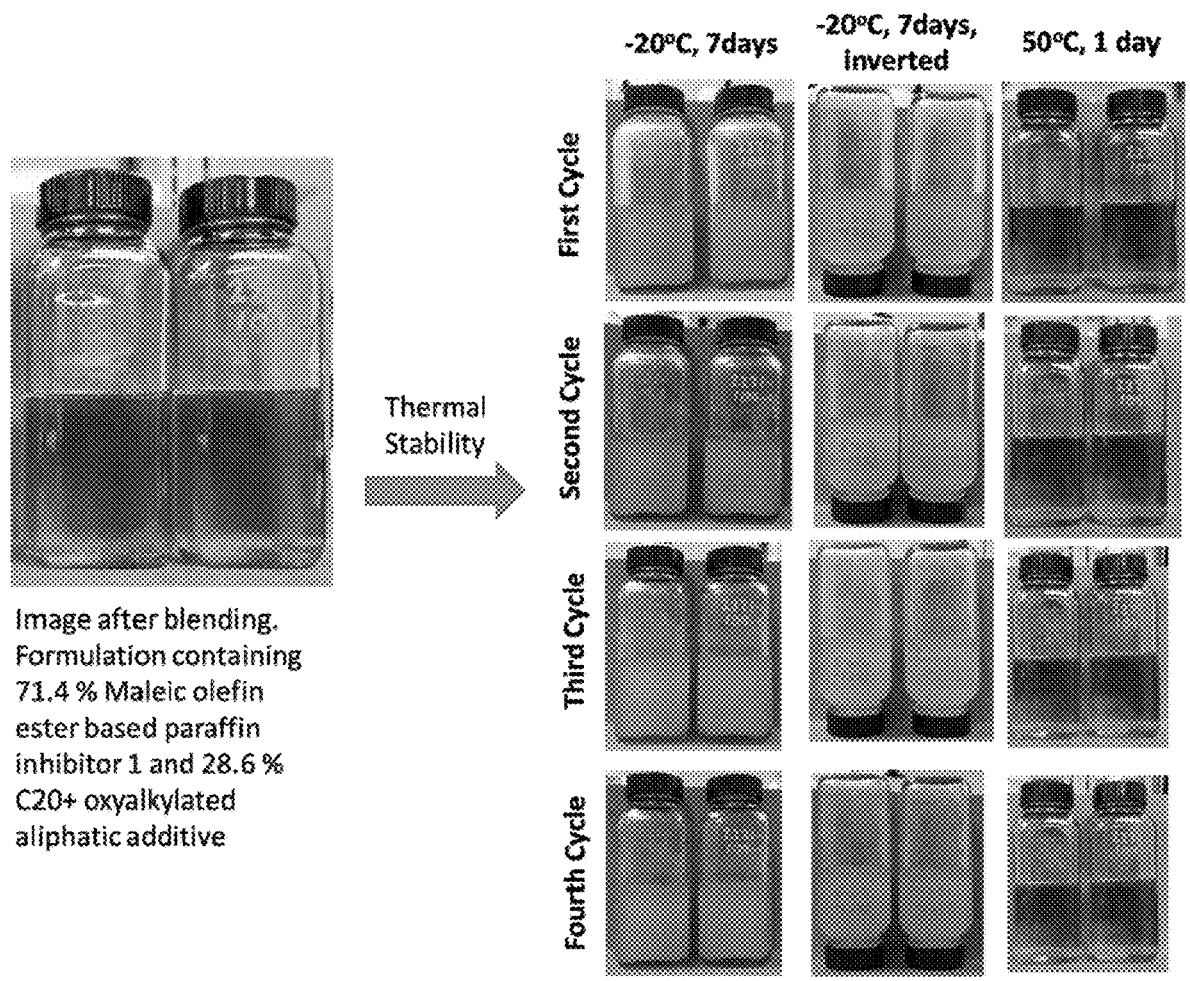
FIG. 1 are photographs illustrating the bottle performance of samples of a winterized paraffin inhibitor of the kind disclosed herein during storage and inversion at −20° C. over a period of 6 to 7 days.

It has been discovered that an oxyalkylated branched aliphatic compound having 12 or more carbon atoms may be applied to high molecular weight aliphatic polymeric paraffin inhibitors, the kinds that are typically used to prevent paraffin deposition in hydrocarbon streams found in cold environments in which temperatures may range from about 0° C. to −40° C., to form winterized paraffin inhibitors that are better protected against freezing or crystallization during use or storage in these temperature conditions.

The high molecular weight aliphatic polymer paraffin inhibitors commonly injected into wellbores to prevent the deposition of naturally occurring paraffins founds in pro- duced hydrocarbon streams, such as crude oil, include, but are not limited to, olefin maleic esters, aliphatic olefin maleic imides, polyol-based polymers, acrylate-based polymers, methacrylate-based polymers, maleate-based polymers, and combinations thereof. Because of highly aliphatic nature of these compounds, it has been found that introducing winterizing agents that can more easily be dissolved or inserted into or that are soluble with the polymer structure of the paraffin inhibitor may result in improved winterization of the paraffin inhibitor, which is to say, improved ability to prevent the freezing or crystallization of the paraffin inhibitor during use or storage in freezing or sub-freezing temperatures.

In this regard, oxyalkylated linear or branched aliphatic compounds having 12 or more carbon atoms have been shown to have strong interaction with the polymer structure of the highly aliphatic paraffin inhibitors that are commonly used to treat crude oils and such at cold temperatures, making them effective in forming stable, winterized paraffin inhibitor formulations. More specifically, the aliphatic nature of the oxyalkylated linear or branched aliphatic compounds renders these molecules "soluble" with the polymer matrix of the paraffin inhibitors while the grafted ethylene-oxide and/or propylene oxide polymer moieties of these molecules confer steric hindrance, factors that can help prevent crystallization and promote pourability or flowability at sub-freezing temperatures.

In a non-limiting embodiment, the backbone of the oxyalkylated linear or branched aliphatic compound winterizing agent comprises a branched aliphatic compound having 12 or more carbon atoms. The branches of the aliphatic chain may be composed functional groups made up of 2 to 28 carbon atoms each. The branches may have different carbon numbers from each other. Examples of such functional groups include, but are not limited to, alkyl groups having 2 to 28 carbon atoms, arylalkyl groups having 2 to 28 carbon atoms, cycloalkyl groups having 2 to 28 carbon atoms, and combinations thereof. In the case of long-chain branched aliphatic compounds, the compounds may additionally, or in the alternative, comprise branches having functional groups selected from the group consisting of oxygen functional groups, nitrogen functional groups, sulfur functional groups, phosphorous functional groups, and combinations thereof. In one non-restrictive embodiment, the branched aliphatic compound may be crosslinked with one or more other branched aliphatic compound to give a dendrimer or hyperbranched aliphatic compound. It is appreciated by one of ordinary skill in the art that a hyperbranched aliphatic may have a random or defined hierarchical structure. A dendrimer may be considered to be a hyperbranched aliphatic compound with a defined hierarchical structure.

The oxyalkylated branched aliphatic compound winterizing agent is produced by oxyalkylating the branched aliphatic compound having 12 or more carbon atoms, which involves grafting the branched aliphatic compound having 12 or more carbon atoms with a polyether. The polyethers that may be grafted upon the long chain branched aliphatic compound include, without limitation, polymers of ethylene oxide ("EO"), polymers of propylene oxide ("PO"), polymers of butylene oxide, and combinations thereof. These polymers may be random polymers, block polymers or combinations thereof. The polyether-grafted branched aliphatic compound may be formed through a crosslinking reaction involving an epoxide opening to achieve the desired architecture. The crosslinking reaction may be base-catalyzed, acid-catalyzed, or uncatalyzed. The crosslinkers useful in forming the polyether-grafted branched aliphatic compound may include one or more of the following: an epoxide, an isocyanate, a carboxylic acid, an acyl halide, an aldehyde, a nitrile, a halide, an ester, an anhydride, an alcohol, an amine, and an amide. Thus, in some non-limiting embodiments, the oxyalkylation of the branched aliphatic compound comprises grafting the branched aliphatic compound with a polyether via a ring-opening reaction.

In another non-limiting embodiment, the oxyalkylated branched aliphatic compound winterizing agent having 12 or more carbon atoms that is formed by the oxyalkylating reaction described in the previous paragraph may be post-functionalized with a sulfate, sulfonate, phosphate, phosphonate, and/or other such charged species.

Upon the producing the oxyalkylated branched aliphatic compound winterizing agent having 12 or more carbon atoms, it may be combined with, applied to, or introduced to one or more of the high molecular weight aliphatic polymer paraffin inhibitors disclosed herein to form a winterized paraffin inhibitor formulation. In this formulation, the oxyalkylated branched aliphatic compound winterizing agent having 12 or more carbon atoms may be present in an amount ranging from about 1 wt. % independently to about 70 wt. %, alternatively from about 10 wt. % independently to about 50 wt. %, and in another non-restrictive version, from about 15 wt. % independently to about 30 wt. %, based on total weight of oxyalkylated branched aliphatic compound and the high molecular weight aliphatic polymer paraffin inhibitor. As used herein with respect to a range, "independently" means that any threshold given may be used together with any other threshold given to provide a suitable alternative range.

In one non-limiting embodiment, the winterized paraffin inhibitor formulation described herein has a viscosity ranging from about 5 cP to about 60 cP at a temperature of from about 25° C. independently to about −20° C.; alternatively from about −10° C. independently to about −30° C.; and in another non-limiting embodiment at around −20° C. In one non-limiting embodiment the viscosity of the formulation ranges from about 5 cP at room temperature (defined herein as 25° C.) to about 60 cP at low temperature, where "low temperature" is defined herein as any of the ranges below room temperature given above.

Once formed, the winterized paraffin formulation described herein may be stored, or may be introduced into a wellbore to interact with a hydrocarbon stream containing paraffins to inhibit or prevent the deposition of paraffins in the stream. Examples of such streams in the oilfield environment include, but are not limited to, crude oil, a production fluid, and combinations thereof. In a non-limiting embodiment, the effective amount of the winterized paraffin formulation that may be introduced to the stream for purposes of inhibiting paraffin deposition ranges from about 10 ppm independently to about 10,000 ppm, or from about 100 ppm independently to about 1000 ppm, based on the total volume of the stream.

A goal of the forming the winterized paraffin inhibitor formulation by combining the oxyalkylated branched aliphatic compound winterizing agent having 12 or more carbon atoms with a high molecular weight aliphatic polymer paraffin inhibitors is to produce a winterized paraffin inhibitor that can withstand freezing or crystallization during use or storage in freezing and/or sub-freezing conditions and that can be used to effectively prevent or inhibit deposition of paraffins in hydrocarbon streams paraffins in an environment in which the temperature ranges from about 0° C. to −40° C. For purposes of this disclosure, the term "prevent" and "inhibit" are used synonymously and are both defined to mean "stop." While complete prevention of freezing or crystallization or complete inhibition of paraffin deposition is desirable, it should be appreciated that complete prevention or inhibition is not necessary for the methods and additives discussed herein to be considered effective.

It can be appreciated that other, optional additives may also be added to the crude oil stream. These optional additives may include, but are not necessarily limited to, coagulants, flocculants, corrosion inhibitors, viscosity reducers, winterizing agents different from the oxyalkylated linear or branched aliphatic compound, friction reducers, scale inhibitors, scale dissolvers, paraffin inhibitors, pour point depressants, asphaltene inhibitors, clay swelling inhibitors, biocides, antifoulants, flow back aids, surfactants, and combinations thereof. In one non-limiting embodiment, the oxyalkylated branched aliphatic compound may be combined with other winterization agents including, but not necessarily limited to, alcohols, alkylated naphthalenes, polyalkyl methacrylates, chlorinated wax, styrene ester copolymers, and the like.

The invention will be further described with respect to the following Examples, which are not meant to limit the invention, but rather to further illustrate some embodiments.

EXAMPLES

Example 1

In FIG. 1, multiple samples of a winterized paraffin inhibitor formulation containing 71.4 wt. % of a maleic olefin ester based paraffin inhibitor 1 and 28.6 wt. % of a C20+ oxyalkylated aliphatic ("Additive") were stored and inverted in clear bottles at a temperature of −20° C. over the course of 6-7 days to evaluate the long term stability of these winterized paraffin inhibitor formulations. The photographs of the bottles with the samples inside show that the formulations do not form solids and are completely flowing when stored at −20° C. for longer periods of time. And, when cycled, the formulations consistently returned to their original clear phase.

Example 2

In addition to these tests, the properties, conditions, and inhibition effectiveness of a sample of the maleic olefin ester based paraffin inhibitor 1 without Additive were compared to the properties, conditions, and inhibition effectiveness of a sample of the maleic olefin ester based paraffin inhibitor 1 with the C20+ oxyalkylated aliphatic additive.

Figure 2:
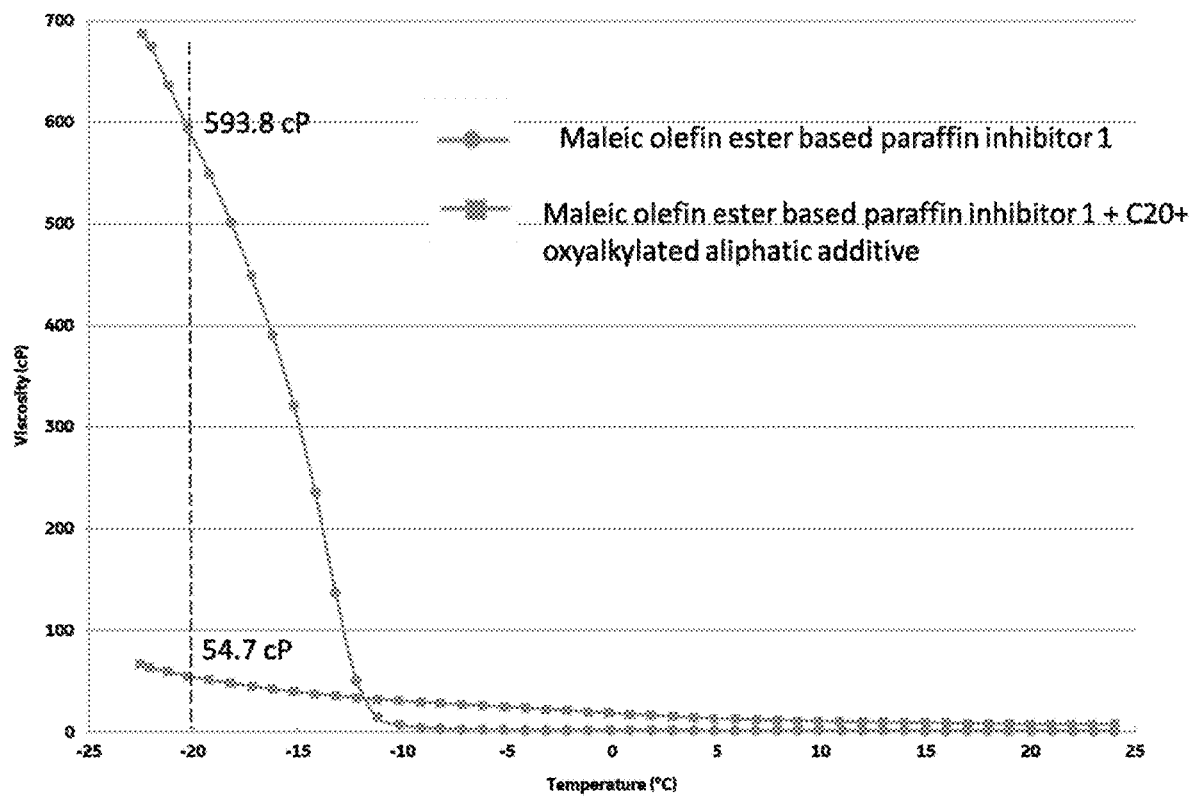
FIG. 2 is a graphic illustration comparing the viscosity of a high molecular weight aliphatic polymer paraffin inhibitor to the viscosity of the same paraffin inhibitor containing an oxyalkylated branched aliphatic winterizing additive of the kind disclosed herein as a function of temperatures ranging from −23° C. to about 23° C.

FIG. 2 shows that the viscosity of maleic olefin ester based paraffin inhibitor 1 with the C20+ oxyalkylated aliphatic additive was 10 times less at −20° C. than the viscosity of the non-winterized maleic olefin ester based paraffin inhibitor 1.

Example 3

Finally, Table I below shows the "cold finger test" performance results of a sample of maleic olefin ester based paraffin inhibitor 1 with and without the additive in waxy crude oil. The Low Shear Wax Deposition (i.e. cold finger) procedure is used to screen paraffin inhibitors in waxy crude oils. The test unit consists of two main parts. A water bath chamber that keeps the oil at prescribed temperature (usually above the oil's wax appearance temperature) and a metal tube (the cold finger) through which cold fluid circulates, maintaining the finger temperature below that of the surrounding oil. The data in Table I show that the winterized formulation, the one with the Additive, performed slightly better at inhibiting paraffin deposition than the paraffin inhibitor by itself.

TABLE I

Cold Finger Test of Maleic Olefin Ester Based Paraffin Inhibitor 1 Alone as Compared to Formulation Containing the Additive

| Product | Deposit | Inhibition (%) |
|---|---|---|
| Maleic olefin ester based paraffin inhibitor 1 | 0.980 | 44.9% |
| Maleic olefin ester based paraffin inhibitor 1 + C20+ oxyalkylated aliphatic additive | 0.960 | 46.1% |

Example 4

In a separate evaluation, a second set of paraffin inhibitor formulation samples having varying amounts of sulfated C24 oxyalkylated aliphatic winterization agent and isopropanol were stored at −20° C. for 24 hours and their flow properties observed.

Table II shows that the samples containing the highest amounts of C20+ oxyalkylated aliphatic winterization agent exhibited flowability while the other samples began to freeze when stored at −20° C. for 24 hours.

TABLE II

Flow Property Evaluation of Maleic Olefin Ester Based Paraffin Inhibitor 2 with Varying Amounts of Additive and Isopropanol

| Maleic olefin ester based paraffin inhibitor 2 | Sulfated C24 oxyalkylated aliphatic winterization agent 1 | Isopropanol | Observation |
|---|---|---|---|
| 80 | 6.6 | 13.4 | Slushy |
| 66.7 | 5.5 | 27.7 | Slushy |
| 50 | 16.5 | 33.5 | Flowing |

| Maleic olefin ester based paraffin inhibitor 2 | Sulfated C24 oxyalkylated aliphatic winterization agent 2 | Isopropanol | Observation |
|---|---|---|---|
| 80 | 6.6 | 13.4 | Slushy |
| 66.7 | 5.5 | 27.7 | Slushy |
| 62.5 | 12.4 | 25.1 | Flowing |

| Maleic olefin ester based paraffin inhibitor 2 | Sulfated C24 oxyalkylated aliphatic winterization agent 3 | Isopropanol | Observation |
|---|---|---|---|
| 80 | 6.6 | 13.4 | Slushy |
| 66.7 | 5.5 | 27.7 | Slushy |
| 62.5 | 12.4 | 25.1 | Flowing |

In the foregoing specification, the invention has been described with reference to specific embodiments thereof. However, it will be evident that various modifications and changes can be made thereto without departing from the broader spirit or scope of the invention as set forth in the appended claims. Accordingly, the specification is to be regarded in an illustrative rather than a restrictive sense. For example, uses, reactions, paraffin inhibitors, branched aliphatic compounds, functional groups, crosslinkers, streams, compositions, proportions, and amounts not specifically identified or described in this disclosure or not evaluated in a particular Example are still expected to be within the scope of this invention.

The present invention may suitably comprise, consist or consist essentially of the elements disclosed and may be practiced in the absence of an element not disclosed. For instance, the claims methods or formulation may comprise, consist essentially of, or consist of the steps or components recited in the independent claims, respectively. More specifically, there may be provided a method for winterizing a paraffin inhibitor, where the method consists essentially of or consists of introducing an oxyalkylated linear or branched aliphatic compound having 12 or more carbon atoms into a paraffin inhibitor composed of a high molecular weight aliphatic polymer in an amount effective to thereby preventing the freezing or crystallization of the paraffin inhibitor at temperatures ranging from about 0° C. to −40° C.

There may be further provided a winterized paraffin inhibitor formulation, where the formulation consists essentially of or consists of an oxyalkylated linear or branched aliphatic compound having 12 or more carbons and a high molecular weight aliphatic polymer paraffin inhibitor wherein the oxyalkylated branched aliphatic compound is present in an amount ranging from 1 wt. % to about 70 wt. %, based on total weight of oxyalkylated linear or branched aliphatic compound and the high molecular weight aliphatic polymer paraffin inhibitor.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A winterized paraffin inhibitor formulation, the formulation comprising:
    an oxyalkylated linear or branched aliphatic compound having 12 or more carbons; and
    a high molecular weight aliphatic polymer paraffin inhibitor present in an amount ranging from 1 wt. % to about 70 wt. %, based on total weight of oxyalkylated linear or branched aliphatic compound and the high molecular weight aliphatic polymer paraffin inhibitor;
    wherein the oxyalkylated linear or branched aliphatic compound is formed by the oxyalkylation of a linear or branched aliphatic compound having 12 or more carbon atoms that comprises grafting the linear or branched aliphatic compound having 12 or more carbon atoms with a polyether via a ring-opening reaction, and wherein the polyether is selected from a group consisting of a polymer of ethylene oxide, a polymer of propylene oxide, a polymer of butylene oxide, and combinations thereof, and
        wherein the branched aliphatic compound comprises branches, each branch consists of aliphatic alkyl functional groups containing 2 to 28 carbon atoms and optionally functional groups selected from the group consisting of oxygen functional groups, nitrogen functional groups, sulfur functional groups, phosphorous functional groups, and combinations thereof, and
        wherein the branched aliphatic compounds are grafted with a polyether is a crosslinked branched aliphatic compound, and wherein the branched aliphatic compound has 20 or more carbon atoms.

2. The winterized paraffin inhibitor formulation of claim 1, wherein the formulation is a flowing liquid at a temperature of between about 0° C. and about −40° C.

3. The formulation of claim 2, wherein the viscosity of the formulation ranges from about 5 cP at room temperature to about 60 cP at a temperature ranging from about −10° C. to about −30° C.

4. The winterized paraffin inhibitor formulation of claim 1, wherein high molecular weight aliphatic polymer paraffin inhibitor is selected from a group consisting of olefin maleic esters, aliphatic olefin maleic imides, polyol-based polymers, acrylate-based polymers, methacrylate-based polymers, maleate-based polymers, and combinations thereof.

5. A method for inhibiting paraffin deposition in a crude oil stream containing paraffins, the method comprising: introducing a winterized paraffin inhibitor comprising:
    (1) an oxyalkylated linear or branched aliphatic compound having 12 or more carbons, wherein the oxyalkylated linear or branched aliphatic compound is formed by the oxyalkylation of a linear or branched aliphatic compound having 12 or more carbon atoms that comprises grafting the linear or branched aliphatic compound having 12 or more carbon atoms with a polyether via a ring-opening reaction, and wherein the polyether is selected from a group consisting of a polymer of ethylene oxide, a polymer of propylene oxide, a polymer of butylene oxide, and combinations thereof, and
        wherein the branched aliphatic compound comprises branches, each branch consists of aliphatic alkyl functional groups containing 2 to 28 carbon atoms and optionally functional groups selected from the group consisting of oxygen functional groups, nitrogen functional groups, sulfur functional groups, phosphorous functional groups, and combinations thereof, and
        wherein the branched aliphatic compounds are grafted with a polyether is a crosslinked branched aliphatic compound, and wherein the branched aliphatic compound has 20 or more carbon atoms; and
    (2) a high molecular weight aliphatic polymer paraffin inhibitor to a hydrocarbon stream containing paraffins in an environment in which the temperature ranges from about 0° C. to −40° C., the high molecular weight aliphatic polymer paraffin inhibitor being present in an amount ranging from 1 wt. % to about 70 wt. %, based on total weight of oxyalkylated linear or branched aliphatic compound and the high molecular weight aliphatic polymer paraffin inhibitor; and
    preventing paraffin deposition within the hydrocarbon stream.

6. The method of claim 5 where the high molecular weight aliphatic polymer paraffin inhibitor selected from the group consisting of olefin maleic esters, aliphatic olefin maleic imides, polyol-based polymers, acrylate-based polymers, methacrylate-based polymers and/or maleate-based polymers.

7. The method of claim 5 further comprising adding at least one other additive to the crude oil stream, where the at least one other additive is selected from the group consisting of coagulants, flocculants, corrosion inhibitors, viscosity reducers, winterizing agents different from the oxyalkylated linear or branched aliphatic compound, friction reducers, scale inhibitors, scale dissolvers, paraffin inhibitors, pour point depressants, asphaltene inhibitors, clay swelling inhibitors, biocides, antifoulants, flow back aids, surfactants, and combinations thereof.

* * * * *